United States Patent
Ono

(10) Patent No.: US 11,225,566 B2
(45) Date of Patent: Jan. 18, 2022

(54) LATEX AND COMPOSITE

(71) Applicant: ZEON CORPORATION, Tokyo (JP)

(72) Inventor: Kentaro Ono, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 16/979,571

(22) PCT Filed: Mar. 12, 2019

(86) PCT No.: PCT/JP2019/009937
§ 371 (c)(1),
(2) Date: Sep. 10, 2020

(87) PCT Pub. No.: WO2019/176921
PCT Pub. Date: Sep. 19, 2019

(65) Prior Publication Data
US 2021/0009791 A1 Jan. 14, 2021

(30) Foreign Application Priority Data
Mar. 12, 2018 (JP) .............................. JP2018-043769

(51) Int. Cl.
| | | |
|---|---|---|
| *C08L 9/04* | (2006.01) | |
| *C08L 33/08* | (2006.01) | |
| *C08F 8/04* | (2006.01) | |
| *C08F 236/12* | (2006.01) | |
| *C09J 109/04* | (2006.01) | |
| *C08K 5/37* | (2006.01) | |
| *C08C 19/00* | (2006.01) | |
| *C08C 3/02* | (2006.01) | |
| *C08C 1/15* | (2006.01) | |

(52) U.S. Cl.
CPC .................. *C08L 9/04* (2013.01); *C08F 8/04* (2013.01); *C08F 236/12* (2013.01); *C08K 5/37* (2013.01); *C08L 33/08* (2013.01); *C09J 109/04* (2013.01)

(58) Field of Classification Search
CPC .... C08L 9/04; C08L 33/08; C08K 5/37; C09J 109/04; C08F 236/04; C08F 8/04; C08F 236/06; C08F 2810/20; C08C 19/00; C08C 3/02; C08C 1/15
See application file for complete search history.

(56) References Cited

U.S. PATENT DOCUMENTS

2020/0087434 A1* 3/2020 Watanabe ................. C08C 1/15

FOREIGN PATENT DOCUMENTS

| JP | 4368646 B2 * | 11/2009 | ............... C08L 9/04 |
| JP | 4368646 B2 | 11/2009 | |
| WO | WO-2017164078 A1 * | 9/2017 | ............. C08L 15/00 |

OTHER PUBLICATIONS

Jun. 11, 2019 Search Report issued in International Patent Application No. PCT/JP2019/009937.

* cited by examiner

*Primary Examiner* — Robert D Harlan
(74) *Attorney, Agent, or Firm* — Oliff PLC

(57) ABSTRACT

A latex including: a nitrile rubber containing an α,β-ethylenically unsaturated nitrile monomer unit in a content of 8 to 50 wt % and an α,β-ethylenically unsaturated dicarboxylic acid monoester monomer unit in a content of 1 to 10 wt %, and having an iodine value of 120 g/100 g or less; and a benzisothiazoline-based compound represented by the following general formula (1), wherein the content of the benzisothiazoline-based compound is 50 ppm by weight or more, with respect to the nitrile rubber, and a redox potential of the latex is 80 to 800 mV.

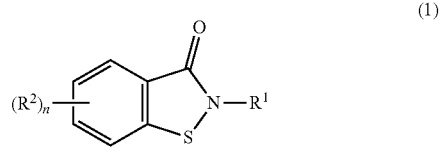

(1)

In the general formula (1) mentioned above, $R^1$ represents a hydrogen atom, or a substituted or unsubstituted organic group, $R^2$ each independently represents a hydrogen atom, or a substituted or unsubstituted organic group, and "n" represents an integer of 0 to 4.

6 Claims, No Drawings

LATEX AND COMPOSITE

TECHNICAL FIELD

The present invention relates to a latex that is not easy to rot or easy to yellow, and a composite obtained by using the latex.

BACKGROUND ART

Latexes of nitrile rubbers containing a nitrile monomer unit have hitherto been used in a wide variety of applications. For example, such latexes have been used in a wide variety of fields: raw materials of nonwoven fabrics widely used as clothing, industrial materials such as filters and heat insulators, hygienic goods such as masks and white coats, automobile interior materials and air conditioning filters, and the like; compositions for dip forming of nipple, glove, and the like; adhesives between the woven-fabric base-material and rubber members of toothed belts and other various belts for automobiles and industries; adhesives for rubber-reinforcing fibers such as tire cords; fiber processing agent; various binders such as battery binders and paper coating binders; papermaking; paper coating compositions; compositions for modifying resins; foam rubbers; various sealing materials; coating materials; friction materials and the like.

Meanwhile, nitrile rubber latexes have hitherto involved problems of rot such as generation of unusual odor due to proliferation of fungi during storage after production in storage tanks, or during storage after being filled and shipped in containers, marine containers, drums, and eighteen liter drums; because nitrile rubber latexes are used such an extremely wide variety of applications as described above, nitrile rubber latexes have chances to be shipped overseas more frequently than hitherto, and have been demanded to have rot resistance as higher storage stability and preservation stability than hitherto.

For example, Patent Document 1 discloses, as a latex of copolymer having excellent long-term storage stability, a latex of a copolymer obtained by emulsion polymerization of a monomer comprising 50 to 80 parts by weight of an aliphatic conjugated diene monomer, 20 to 50 parts by weight of a vinyl cyanide-based monomer, and 0 to 10 parts by weight of an ethylenically unsaturated carboxylic acid-based monomer, wherein the latex of the copolymer contains 0.001 parts by weight or more of benzisothiazoline-based compound and 0.001 parts by weight or more of 2-methyl-4-isothiazolin-3-one with respect to 100 parts by weight of the copolymer (in terms of the solid content), and a redox potential is −100 mV to +300 mV.

RELATED ART

Patent Documents

Patent Document 1: Japanese Patent No. 4368646

SUMMARY OF THE INVENTION

Problem to be Solved by the Invention

However, the present inventors have found that the techniques disclosed in the prior art cannot sufficiently prevent rot of a latex of a nitrile rubber containing an α,β-ethylenically unsaturated nitrile monomer unit in a ratio of 8 to 50 wt %, and an α,β-ethylenically unsaturated dicarboxylic acid monoester unit in a ratio of 1 to 10 wt % and having an iodine value of 120 g/100 g or less. Further, there is also a demand for a technique for preventing yellowing of such latex.

The present invention has been completed by considering the above situation, and an object of the present invention is to provide a latex of a nitrile rubber containing an α,β-ethylenically unsaturated nitrile monomer unit in the amount of 8 to 50 wt % and an α,β-ethylenically unsaturated dicarboxylic acid monoester monomer unit in the amount of 1 to 10 wt %, and having an iodine value of 120 g/100 g or less, which is not easy to rot or easy to yellow.

Means for Solving the Problem

The present inventors engaged in a diligent study to solve the above-mentioned problem to be solved, and consequently has perfected the present invention by discovering that the above objects can be achieved by using a benzisothiazoline-based compound having a particular structure in a strictly limited amount, and by appropriately adjusting a redox potential of the latex, rot resistance of a latex is significantly improved, as well as yellowing of the latex is prevented, the latex being a latex of an nitrile rubber containing an α,β-ethylenically unsaturated nitrile monomer unit in a ratio of 8 to 50 wt %, and an α,β-ethylenically unsaturated dicarboxylic acid monoester monomer unit in a ratio of 1 to 10 wt %, and having an iodine value of 120 g/100 g or less.

That is, the present invention provides a latex comprising: a nitrile rubber containing an α,β-ethylenically unsaturated nitrile monomer unit in a content of 8 to 50 wt % and an α,β-ethylenically unsaturated dicarboxylic acid monoester monomer unit in a content of 1 to 10 wt %, and having an iodine value of 120 g/100 g or less; and a benzisothiazoline-based compound represented by the following general formula (1), wherein the content of the benzisothiazoline-based compound is 50 ppm by weight or more with respect to the nitrile rubber, and a redox potential of the latex is 80 to 800 mV.

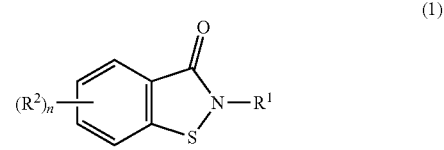

(1)

In the general formula (1) mentioned above, $R^1$ represents a hydrogen atom, or a substituted or unsubstituted organic group, $R^2$ each independently represents a hydrogen atom, or a substituted or unsubstituted organic group, and "n" represents an integer of 0 to 4.

In the latex of the present invention, the benzisothiazoline-based compound is preferably 1,2-benzisothiazolin-3-one.

The latex of the present invention preferably further comprises a thermosetting resin.

The present invention also provides a composite comprising a fiber base material and a rubber member, wherein the fiber base material and the rubber member adhere by a bonding layer foamed with the above-mentioned latex.

Effects of Invention

According to the present invention, a latex that is not easy to rot or easy to yellow is provided, the latex being a latex of a nitrile rubber containing an α,β-ethylenically unsaturated nitrile monomer unit in a content of 8 to 50 wt % and an α,β-ethylenically unsaturated dicarboxylic acid monoester monomer unit in a content of 1 to 10 wt %, and having an iodine value of 120 g/100 g or less.

DESCRIPTION OF EMBODIMENTS

The latex of the present invention comprises a nitrile rubber and a benzisothiazoline-based compound.

Nitrile Rubber

The nitrile rubber is a nitrile rubber containing an α,β-ethylenically unsaturated nitrile monomer unit and an α,β-ethylenically unsaturated dicarboxylic acid monoester monomer unit, and having an iodine value of 120 g/100 g or less.

The α,β-ethylenically unsaturated nitrile monomer forming an α,β-ethylenically unsaturated nitrile monomer unit is not particularly limited as long as it is an α,β-ethylenically unsaturated compound having a nitrile group, and examples thereof include acrylonitrile; α-halogenoacrylonitrile such as α-chloroacrylonitrile, α-bromoacrylonitrile; α-alkylacrylonitrile such as methacrylonitrile; and the like. Among these, acrylonitrile and methacrylonitrile are preferred, and acrylonitrile is more preferred. The α,β-ethylenically unsaturated nitrile monomer may be used alone, or two or more of them may be used in combination.

The content of the α,β-ethylenically unsaturated nitrile monomer unit is from 8 to 50 wt %, preferably from 10 to 40 wt %, with respect to the total monomer units. When the content of the α,β-ethylenically unsaturated nitrile monomer unit is too small, the nitrile rubber may be inferior in oil resistance, and by contrast, when it is too large, freeze resistance may decrease.

As the α,β-ethylenically unsaturated dicarboxylic acid monoester monomer to form α,β-ethylenically unsaturated dicarboxylic acid monoester monomer unit, a maleic acid monoalkyl ester such as monomethyl maleate, monoethyl maleate, monopropyl maleate, and mono-n-butyl maleate; a maleic acid monocycloalkyl ester such as monocyclopentyl maleate, monocyclohexyl maleate, and monocycloheptyl maleate; a maleic acid monoalkyl cycloalkyl ester such as monomethyl cyclopentyl maleate and monoethyl cyclohexyl maleate; a fumaric acid monoalkyl ester such as monomethyl fumarate, monoethyl fumarate, monopropyl fumarate, and mono-n-butyl fumarate; a fumaric acid monocycloalkyl ester such as monocyclopentyl fumarate, monocyclohexyl fumarate, and monocycloheptyl fumarate; a fumaric acid monoalkyl cycloalkyl ester such as monomethyl cyclopentyl fumarate and monoethyl cyclohexyl fumarate; a citraconic acid monoalkyl ester such as monomethyl citraconate, monoethyl citraconate, monopropyl citraconate, and mono-n-butyl citraconate; a citraconic acid monocycloalkyl ester such as monocyclopentyl citraconate, monocyclohexyl citraconate, and monocycloheptyl citraconate; a citraconic acid monoalkyl cycloalkyl ester such as monomethyl cyclopentyl citraconate and monoethyl cyclohexyl citraconate; an itaconic acid monoalkyl ester such as monomethyl itaconate, monoethyl itaconate, monopropyl itaconate, and mono-n-butyl itaconate; an itaconic acid monocycloalkyl ester such as monocyclopentyl itaconate, monocyclohexyl itaconate, and monocycloheptyl itaconate; an itaconic acid monoalkyl cycloalkyl ester such as monomethyl cyclopentyl itaconate, and monoethyl cyclohexyl itaconate; and the like may be mentioned.

The α,β-ethylenically unsaturated dicarboxylic acid monoester monomer may be used alone, or two or more of them may be used in combination. Among these, a maleic acid monoalkyl ester is preferred, and a maleic acid mono-n-butyl is more preferred since the effect of the present invention becomes more significant. Note that the number of carbon atoms of the alkyl group in the above alkyl ester is preferably 2 to 8.

The content of the α,β-ethylenically unsaturated dicarboxylic acid monoester monomer unit is 1 to 10 wt %, preferably 3 to 8 wt %, with respect to the total monomer units. By setting the content of the α,β-ethylenically unsaturated dicarboxylic acid monoester monomer unit within the above ranges, the nitrile rubber can be obtained having good mechanical properties and compression set resistance. In addition, when the content of the α,β-ethylenically unsaturated dicarboxylic acid monoester monomer unit does not fall within the above range, a rot-proof effect due to addition of the benzisothiazoline-based compound cannot be sufficiently obtained.

In addition, it is preferable that the nitrile rubber also contains a conjugated diene monomer unit in addition to the α,β-ethylenically unsaturated nitrile monomer unit and the α,β-ethylenically unsaturated dicarboxylic acid monoester monomer unit in order to have rubber elasticity.

As the conjugated diene monomer to form the conjugated diene monomer unit, a conjugated diene monomer having 4 to 6 carbon atoms such as 1,3-butadiene, isoprene, 2,3-dimethyl-1,3-butadiene, 1,3-pentadiene, and chloroprene are preferable, 1,3-butadiene and isoprene are more preferable, and 1,3-butadiuene is particularly preferable. The conjugated diene monomers may be used as single types alone or as a plurality of types combined.

The content of the conjugated diene monomer unit (including the hydrogenated part) is, with respect to the total monomer units, preferably 10 to 90 wt %, more preferably 15 to 85 wt %, still more preferably 20 to 80 wt %, and particularly preferably 25 to 75 wt %. By setting the content of the conjugated diene monomer unit within the above-mentioned range, it is possible to obtain the nitrile rubber having the excellent rubber elasticity while maintaining the good heat resistance and chemical stability.

Further, in addition to the α,β-ethylenically unsaturated nitrile monomer unit, the α,β-ethylenically unsaturated dicarboxylic acid monoester monomer unit, and the conjugated diene monomer unit, the nitrile rubber may contain other monomer units copolymerizable with monomers constituting these monomer units. Examples of such other monomers include α,β-ethylenically unsaturated monocarboxylic acid ester monomers, ethylene, α-olefin monomers, aromatic vinyl monomers, fluorinecontain vinyl monomers, copolymerizable anti-aging agents, and the like.

As the α,β-ethylenically unsaturated monocarboxylic acid ester monomer, a (meth)acrylic acid ester (abbreviations for "methacrylic acid ester and acrylic acid ester," and the same shall apply hereinafter) having an alkyl group having 1 to 18 carbon atoms such as methyl acrylate, ethyl acrylate, n-butyl acrylate, isobutyl acrylate, n-dodecyl acrylate, methyl methacrylate, and ethyl methacrylate; a (meth) acrylic acid ester having an alkoxy alkyl group having 2 to 18 carbon atoms such as methoxymethyl acrylate, methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; a (meth)acrylic acid ester having a cyanoalkyl group having 2 to 12 carbon atoms such as α-cyanoethyl acrylate, α-cyanoethyl methacrylate, and cyanobutyl methacrylate; a (meth)acrylic acid ester having a hydroxyalkyl group having 1 to 12 carbon atoms such as 2-hydroxyethyl acrylate, 2-hydroxypropyl acrylate, and 2-hydroxyethyl methacrylate; a (meth)acrylic acid ester having a fluoroalkyl group having 1 to 12 carbon atoms such as trifluoroethyl acrylate, and tetrafluoropropyl methacrylate; and the like may be mentioned. Among these, (meth)acrylic acid ester having an alkyl group having 1 to 18 carbon atoms and (meth)acrylic acid ester having an alkoxyalkyl group having 2 to 18 carbon atoms are preferable, (meth)acrylic acid ester having an alkyl group having 1 to 18 carbon atoms is more preferable, and n-butyl acrylate is particularly preferable. The content of the α,β-ethylenically unsaturated monocarboxylic acid ester monomer unit is, with respect to the total monomer units, preferably 0 to 70 wt %, more preferably 0 to 65 wt %, still more preferably 0 to 60 wt %, and particularly preferably 0 to 55 wt %.

As the α-olefin monomer, ones having 3 to 12 carbon atoms are preferable, and for example, propylene, 1-butene, 4-methyl-1-pentene, 1-hexene, 1-octene, and the like may be mentioned.

As the aromatic vinyl monomer, styrene, α-methylstyrene, vinylpyridine and the like may be mentioned.

As the fluorine-containing vinyl monomer, fluoroethyl vinyl ether, fluoropropyl vinyl ether, o-trifluoromethyl styrene, vinyl pentafluorobenzoate, difluoroethylene, tetrafluoroethylene, and the like may be mentioned.

As the copolymerizable antiaging agent, N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like may be mentioned.

These copolymerizable other monomers may be used as a plurality of types combined. The content of the copolymerizable other monomer unit is preferably 50 wt % or less, more preferably 40 wt % or less, and still more preferably 10 wt % or less, with respect to the total monomer units constituting the nitrile rubber.

The iodine value of the nitrile rubber is 120 g/100 g or less, preferably 100 g/100 g or less, more preferably 90 g/100 g or less, and particularly preferably 80 g/100 g or less. When the iodine value of the nitrile rubber is too high, heat resistance and ozone resistance may be decreased in articles obtained from the latex or the obtained rubber cross-linked product. As described above, when the latex containing the nitrile rubber having a iodine value of 120 g/100 g or less is used, an article excellent in the heat resistance can be obtained. However, the present inventors have found in their study that when a benzisothiazoline-based compound having a particular structure is added to the latex containing the nitrile rubber having the iodine value of 120 g/100 g or less to prevent the rot, the latex becomes to yellow. The yellowing is not observed when the benzisothiazoline-based compound having the particular structure is added to the latex containing the nitrile rubber having the iodine value higher than 120 g/100 g to prevent the rot. The latex of the present invention can provide an article excellent in the heat resistance, and is not easy to rot or easy to yellow.

The polymer Mooney viscosity ($ML_{1+4}$, 100° C.) of the nitrile rubber is preferably 10 to 200, more preferably 15 to 150, still more preferably 15 to 100, and particularly preferably 20 to 70. By setting the polymer Mooney viscosity of the nitrile rubber within the above-mentioned range, good mechanical properties and processability can be obtained.

In addition, the content of the carboxyl group in the nitrile rubber, that is, the number of moles of the carboxyl group per 100 g of the nitrile rubber is preferably $5 \times 10^{-4}$ to $5 \times 10^{-1}$ ephr, more preferably $1 \times 10^{-3}$ to $1 \times 10^{-1}$ ephr, and particularly preferably $5 \times 10^{-3}$ to $6 \times 10^{-2}$ ephr. By setting the content of the carboxyl group of the nitrile rubber within the above-mentioned range, the sufficient rotproof effect by adding the benzisothiazoline-based compound can be obtained.

Benzisothiazoline-Based Compound

The benzisothiazoline-based compound that the latex of the present invention contains is represented by the following general formula (1).

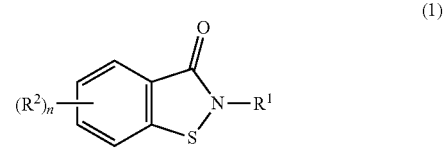

(1)

In the general formula (1) mentioned above, $R^1$ represents a hydrogen atom, or a substituted or unsubstituted organic group, $R^2$ each independently represents a hydrogen atom, or a substituted or unsubstituted organic group, and "n" represents an integer of 0 to 4.

As $R^1$, a hydrogen atom or a substituted or unsubstituted hydrocarbon group is preferable. When $R^1$ is the hydrocarbon group, it may have a chain-like carbon skeleton such as a linear chain or a branched chain, and may have a cyclic carbon skeleton, or may have a substituent such as a halogen atom, an alkoxyl group, a dialkylamino group, an acyl group, or an alkoxycarbonyl group, and the like. The number of the carbon atoms in the hydrocarbon group is preferably 1 to 12, more preferably 1 to 10, and particularly preferably 1 to 8. As the specific example of such a hydrocarbon group, a methyl group, an ethyl group, a propyl group, an isopropyl group, a butyl group, a hexyl group, a cyclohexyl group, an octyl group, a 2-ethylhexyl group, and the like may be mentioned.

When $R^2$ is the organic group, this organic group includes an aliphatic group e.g., an alkyl group or a cycloalkyl group) or an aromatic group, but is preferably the aliphatic group, and is more preferably the alkyl group. The number of the carbon atoms of the alkyl group is preferably 1 to 12, more preferably 1 to 10, and particularly preferably 1 to 8. These alkyl group and cycloalkyl group may each have a substituent such as a halogen atom, an alkoxyl group, a dialkylamino group, an acyl group, and an alkoxycarbonyl group. As the specific example of the aliphatic group, a methyl group, an ethyl group, a propyl group, an isopropyl group, a butyl group, a hexyl group, a cyclohexyl group, an octyl group, a 2-ethyl hexyl group, and the like may be mentioned.

Specific examples of the benzisothiazoline-based compound represented by the above general formula (1) include 1,2-benzoisothiazolin-3-one and N-n-butyl-1,2-benzisothiazolin-3-one, and among these, the 1,2-benzisothiazolin-3-one is preferred since the more excellent rot-proof effect is obtained.

In the latex of the present invention, the content of the benzisothiazoline-based compound represented by the above general formula (1) is 50 ppm by weight or more, preferably 65 to 3000 ppm by weight, and more preferably 80 to 2000 ppm by weight, with respect to the nitrile rubber contained in the latex (when the content of the nitrile rubber is 100 wt %). When the content of the benzisothiazoline-based compound is too small, the rot cannot be sufficiently prevented.

The redox potential of the latex of the present invention is from 80 to 800 mV, preferably from 90 to 700 mV, and more preferably from 100 to 650 mV. When the redox potential of the latex is too high or too low, the rot cannot be sufficiently prevented, and the yellowing cannot be sufficiently prevented.

The latex of the present invention can be produced, for example, by a producing method comprising: a hydrogenation step of dissolving or dispersing a hydrogenation catalyst containing a platinum-group element in a latex of a nitrile rubber obtained by emulsion polymerizing α,β-ethylenically unsaturated nitrile monomer, α,β-ethylenically unsaturated dicarboxylic acid monoester monomer, and optionally a monomer that is copolymerizable with these monomers, such as a conjugated diene monomer so as to hydrogenate a carbon-carbon unsaturated bond of the nitrile rubber; an insoluble complex forming step of complexing the platinum-group element in the latex with a complexing agent to form an insoluble complex; an insoluble complex removing step of removing the insoluble complex from the latex that has undergone the insoluble complex forming step; and an addition step of adding a benzisothiazoline-based compound to the latex that has undergone the insoluble complex removing step.

An emulsion polymerization method as a suitable method for preparing the nitrile rubber is, in general, a method in which polymerization is performed in an aqueous medium using a radical polymerization initiator, and in the emulsion polymerization method, a known polymerization initiator and a known molecular weight modifier may be used. The polymerization reaction may be either a batch type, a semi-batch type, or a continuous type, and a temperature and a pressure for the polymerization are not particularly limited. The emulsifier used is not particularly limited, and anionic surfactants, cationic surfactants, ampholytic surfactants, nonionic surfactants, and the like may be used, but the anionic surfactants are preferred. Each of these emulsifiers may be used alone, or two or more of them may be used in combination. The amount thereof to be used is not particularly limited.

A solid content concentration of the latex of the nitrile rubber obtained by the emulsion polymerization is not particularly limited, but is usually 2 to 50 wt %, preferably 5 to 45 wt %. The solid content concentration can be appropriately adjusted by a known method such as a blending method, a diluting method, or a concentration method.

The above-mentioned hydrogenation step of the production method is a step of dissolving or dispersing the hydrogenation catalyst containing the platinum-group element in the latex of the nitrile rubber described above to hydrogenate the carbon-carbon unsaturated bond of a polymer.

A platinum group element-containing hydrogenation catalyst used in the hydrogenation step is not particularly limited, so long as the platinum group element-containing hydrogenation catalyst is a water-soluble or water-dispersible platinum group element compound; specifically, as such a compound, a ruthenium compound, a rhodium compound, a palladium compound, an osmium compound, an iridium compound, a platinum compound, and the like may be mentioned. In the production method mentioned above, such a hydrogenation catalyst is not carried on a carrier, but is preferably used for the hydrogenation reaction in a state of being dissolved or dispersed in the latex of the above-mentioned nitrile rubber. As the hydrogenation catalyst, a palladium compound or a rhodium compound is preferable, and a palladium compound is particularly preferable. In addition, two or more platinum group element compounds may also be used in combination, but even in such a case, it is preferable to use a palladium compound as a main catalyst component.

The palladium compound is not particularly limited so long as the palladium compound is water-soluble or water-dispersible and exhibits a hydrogenation catalytic activity; the palladium compound is preferably a water-soluble palladium compound. Further, as the palladium compound, usually a II-valent or IV-valent palladium compound is used, and as the form of such a palladium compound, a salt or a complex salt may be mentioned.

As the palladium compound, for example, an organic acid salt such as palladium acetate, palladium formate, and palladium propionate; an inorganic acid salt such as palladium nitrate, and palladium sulfate; a halide such as palladium fluoride, palladium chloride, palladium bromide, and palladium iodide; an inorganic palladium compound such as palladium oxide, and palladium hydroxide; an organic palladium compound such as dichloro(cyclooctadiene)palladium, dichloro(norbornadiene)palladium, and dichlorobis(triphenylphosphine)palladium; a halogenated salt such as sodium tetrachloropalladate, and ammonium hexachloropalladate; a complex salt such as potassium tetracyanopalladate; and the like may be mentioned. Among these palladium compounds, an organic acid salt or inorganic acid salt such as palladium acetate, palladium nitrate, and palladium sulfate; palladium chloride; and a halogenated salt such as sodium tetrachloropalladate, and ammonium hexachloropalladate are preferable; and palladium acetate, palladium nitrate and palladium chloride are more preferable.

In addition, as the rhodium compound, a halide such as rhodium chloride, rhodium bromide, and rhodium iodide; an inorganic acid salt such as rhodium nitrate, and rhodium sulfate; an organic acid salt such as rhodium acetate, rhodium formate, rhodium propionate, rhodium butyrate, rhodium valerate, rhodium naphthenate, and rhodium acetylacetonate; rhodium oxide; rhodium trihydroxide; and the like may be mentioned.

As the platinum group element compounds, commercially available products may be used, or alternatively, the products produced by the known methods can also be used. In addition, the method for dissolving or dispersing the platinum group element compound in the latex of the nitrile rubber is not particularly limited; as such a method, a method in which a platinum group element compound is directly added to the latex, a method in which a platinum group element compound in a state of being dissolved or dispersed in water is added to the latex, and the like may be mentioned. In the case where the platinum group element compound is dissolved or dispersed in water, by using, for example, an inorganic acid such as nitric acid, sulfuric acid, hydrochloric acid, bromic acid, perchloric acid, and phosphoric acid; a sodium salt and potassium salts of these inorganic acids; an organic acid such as acetic acid; and the like in combination, the platinum group element compound is sometimes increased in the solubility in water, so it is preferable.

The amount of the hydrogenation catalyst to be used may be appropriately determined. However, the amount of the platinum-group element contained in the platinum-group element compound as the hydrogenation catalyst is preferably 5 to 6000 ppm by weight, more preferably 10 to 4000 ppm by weight, with respect to the nitrile rubber in the latex obtained by the emulsion polymerization.

In the above-mentioned production method, by using the above-mentioned platinum-group element compound in a state where it is dissolved or dispersed in the latex of the nitrile rubber, it is possible to efficiently proceed the hydrogenation reaction in a latex state. Note that, in the hydrogenation reaction, there is no particular limitation as long as a pH of a hydrogenation reaction liquid (the latex of the nitrile rubber) measured by a pH meter is 12 or less, and is preferably in the range from 2.0 to 11.0, more preferably from 3.0 to 10.5, and still more preferably from 4.0 to 10.0.

The pH of the hydrogenation reaction liquid (the latex of the nitrile rubber) can be adjusted by using a basic compound, an acidic compound, and the like. The basic compound is not particularly limited, and examples thereof include alkali metal compounds, alkaline earth metal compounds, ammonia, ammonium salt compounds, organic amine compounds, and the like, and the alkali metal compounds and alkaline earth metal compounds are preferred. The acidic compound is not particularly limited, and examples thereof include sulfuric acid and nitric acid.

As the alkali metal compounds, hydroxides such as lithium hydroxide, sodium hydroxide, and potassium hydroxide; carbonate compounds such as lithium carbonate, sodium carbonate, and potassium carbonate; bicarbonate compounds such as lithium bicarbonate, sodium bicarbonate, and potassium bicarbonate are preferably used, and among these, the hydroxides are more preferred.

As the alkaline earth metal compounds, hydroxides, carbonates and bicarbonates of the alkaline earth metal such as magnesium, calcium, strontium and barium are preferably used, and among them, the hydroxides are more preferred.

Examples of the ammonium salt compounds include ammonium carbonate, ammonium bicarbonate, and the like.

Examples of the organic amine compounds include triethylamine, ethanolamine, morpholine, N-methylmoipholine, pyridine, hexamethylenediamine, dodecamethylenediamine, xylylenediamine, and the like.

These basic compounds and acidic compounds may be used as they are or may be used by diluting or dissolving in water or an organic solvent such as an alcohol. The basic compounds or the acidic compounds may be used alone, or two or more of them may be used in combination. The amount thereof used may be appropriately selected so that the hydrogenation reaction liquid exhibits a predetermined pH. Further, there is no particular limitation on a method and time of adding the basic compounds and the acidic compounds to the hydrogenation reaction liquid, and examples thereof include a method in which the basic compounds and the acidic compounds are previously added in the latex before the hydrogenation catalyst is added to the hydrogenation reaction liquid, and a method in which the basic compounds and the acidic compounds are added after the start of the hydrogenation reaction.

In addition, a catalyst stabilizer may be used for the purpose of maintaining stability of the platinum-group element compounds in the latex. Specific examples of the catalyst stabilizer include polyvinylpyrrolidone, polyvinyl alcohol, polyvinyl acetal, sodium polyacrylate, sodium polyphosphate, gelatin, albumin, protarbic acid, and lysalbic acid. Among these, polyvinylpyrrolidone, polyvinyl alcohol, and sodium polyacrylate are suitable.

The temperature of the hydrogenation reaction is usually 0 to 200° C., preferably 5 to 150° C., and more preferably 10 to 100° C. The pressure of hydrogen is usually from 0.1 to 20 MPa, preferably from 0.1 to 15 MPa, more preferably from 0.1 to 10 MPa. The reaction time is not particularly limited, but is usually from 30 minutes to 50 hours.

According to the above-mentioned hydrogenation step of the production method, it is possible to quickly perform the hydrogenation reaction despite the reaction in the latex state.

A hydrogenation rate of the obtained hydrogenated nitrile rubber (a ratio of the hydrogenated carbon-carbon double bond with respect to the total of the carbon-carbon double bonds present in the polymer before the reaction) may be arbitrarily controlled in the range from 1 to 100% by appropriately changing the various reaction conditions described above, so that the nitrile rubber having a desired iodine value can be obtained.

The above-mentioned insoluble complex forming step of the production method is a step of forming an insoluble complex by complexing a platinum-group element contained in a platinum-group element compound present in an aqueous medium or a polymer particle of a latex of a nitrile rubber after completion of the hydrogenation reaction with a complexing agent. The insoluble complex is famed as a precipitate in the latex.

Although there is no particular limitation on a method of adding the complexing agent, it is preferable to add the complexing agent to the latex of the nitrile rubber after completion of the hydrogenation reaction in a state such as a powder, a solution, and a dispersion, and then, it is preferable to contact the complexing agent with the platinum-group element compound by stirring, mixing, and the like to form the complex. Then, it is preferable that the insoluble complex famed thereby is grown or aggregated to have a particle diameter larger than that of the polymer particles contained in the latex, from the viewpoint of appropriately removing and recovering the insoluble complex when removing and recovering it from the latex in the insoluble complex removing step described later. Specifically, it is preferable that the above stirring is performed in a waimed state, followed by standing while keeping the waimed state, and then cooling. Further, the pH of the latex at the time of forming the complex is not particularly limited as long as the pH is 12 or less, and is preferably in the range from 2.0 to 11.0, more preferably from 3.0 to 10.5, and still more preferably from 4.0 to 10.0.

The complexing agent may be any one which exhibits a complexing action on the platinum-group element and forms the insoluble complex with the platinum-group element which is insoluble to water, and is not particularly limited, but is preferably one which forms the insoluble complex having strong cohesiveness. As the complexing agent, for example, oxime compounds are mentioned, and dioxime compounds are preferred in view of strength to form the complex, and $\alpha,\beta$-alkanedione dioximes such as dimethylglyoxime and cyclohexanedione dioxime are more preferred. Among these, the dimethylglyoxime is particularly preferred. The amount of the complexing agent to be used is usually 0.5 times to 50 times molar, preferably 1.0 to 30 times molar, with respect to the platinum-group element contained in the platinum-group element compound as the hydrogenation catalyst used.

In addition, in the above-mentioned production method, it is preferable to perform an oxidation treatment for oxidizing the catalyst in a reduced state present in the latex with respect to the latex after completion of the hydrogenation reaction before the complexing agent is added or when the complexing agent is added and mixed. The oxidation treatment can be usually carried out by contacting the catalyst in the reduced state present in the latex with the oxidizing agent. By performing the oxidation treatment, it is possible to make the insoluble complex more easily generated in the insoluble complex forming step.

The oxidizing agent is not particularly limited as long as it has a catalytic oxidation ability, and examples thereof include air (oxygen); peroxides such as hydrogen peroxide, peracetic acid, and perbenzoic acid; and the like, and the air, hydrogen peroxide are preferred, and the hydrogen peroxide is particularly preferred.

The amount of the oxidizing agent to be used is not particularly limited, and is usually 5 to 100 times molar, preferably 10 to 80 times molar, with respect to the platinum-group element contained in the platinum-group element compound as the hydrogenation catalyst used. The contact temperature in contacting the catalyst in the reduced state with the oxidizing agent is usually 0 to 100° C., preferably 10 to 95° C., more preferably 20 to 90° C. The contact time is usually from 10 minutes to 50 hours, preferably from 30 minutes to 40 hours.

The method for contacting the catalyst with the oxidizing agent varies depending on types of the oxidizing agent, but when the air is used as the oxidizing agent, a method of continuously blowing air into the latex in an open state; a method of stirring the latex with an air atmosphere of a gaseous phase portion of a vessel in an open or sealed state; and the like may be mentioned. When the peroxides are used, the peroxide may be added to the latex and stirred.

The insoluble complex is precipitated in the latex which has undergone the insoluble complex forming step. In the above-mentioned production method, in the insoluble complex removing step, the insoluble complex is removed from the latex subjected to the insoluble complex forming step. Examples of a method of removing the insoluble complex from the latex include a method of filtering the latex, a method of centrifuging the latex, and the like.

The latex of the present invention can be suitably produced by the above-mentioned production method, and the redox potential of the latex finally obtained can be adjusted by the amount of the oxidizing agent used to make the insoluble complex more easily generated. Further, by adjusting the amount of the oxidizing agent to be used, it is also possible to adjust the content of the hydrogenation catalyst in the latex finally obtained. Namely, since the latex of the present invention has the redox potential in the range described above, while it contains a nitrile rubber containing the α,β-ethylenically unsaturated nitrile monomer unit in a ratio of 8 to 50 wt %, and the α,β-ethylenically unsaturated dicarboxylic acid monoester monomer unit in a ratio of 1 to 10 wt % and has the iodine value of 120 g/100 g or less, and has an ability to provide the excellent heat resistance to articles, the hydrogenation catalyst is sufficiently removed, so that the latex is not easy to yellow. Further, since the latex of the present invention has the redox potential in the range described above and at the same time contains the benzisothiazoline-based compound having a specific structure in an strictly limited amount, it is not easy to rot. Such a rot-proof effect due to the characteristic use of the benzisothiazoline-based compound is an effect not observed in the conventional latex.

As described above, it is possible to produce the latex containing the nitrile rubber having the iodine value of 120 g/100 g or less by the production method comprising the hydrogenation step, and an article excellent in the heat resistance is obtained from the resultant latex, but in the study of the present inventors, it has been found that when the benzisothiazoline-based compound having a specific structure is added to the latex obtained by the hydrogenation step to prevent the rot, the latex is yellowed. The yellowing is not observed when the benzisothiazoline-based compound having the specific structure is added to the latex obtained without the hydrogenation step (i.e., the latex containing the nitrile rubber with the iodine value of higher than 120 g/100 g) to prevent the rot. According to the above-mentioned production method, it is possible to produce a latex capable of providing an article with the excellent heat resistance, while the redox potential is appropriately adjusted, and thereby is not easy to rot, and is not easy to yellow.

The latex of the present invention may further contain an oxidizing agent. The content of the oxidizing agent of the present latex is usually 5 to 100 times molar, preferably 10 to 80 times molar, with respect to the platinum-group element contained in the platinum-group element compound as the hydrogenation catalyst. By setting the content of the oxidizing agent within the above range, the yellowing of the latex can be further prevented.

The latex of the present invention may further contain a hydrogenation catalyst. As the content of the platinum-group element contained in the platinum-group element compound as the hydrogenation catalyst in the latex of the present invention, it is preferably 0 to 500 ppm by weight, more preferably 0 to 400, still more preferably 1 to 400 ppm by weight, and particularly preferably 5 to 400 ppm by weight, with respect to the nitrile rubber. By setting the content of the hydrogenation catalyst within the above range, the yellowing of the latex can be further prevented.

It is not necessary that the latex of the present invention contains a 2-methyl-4-isothiazoline-3-one, but rather it is preferable that the latex of the present invention does not contain a 2-methyl-4-isothiazoline-3-one because the rot-proof effect by benzisothiazoline-based compound can be sufficiently obtained and the fear that the nitrile rubber has an adverse effect on the excellent properties originally possessed can be reduced.

Further, the latex of the present invention may further contain a thermosetting resin. The latex containing the thermosetting resin can be suitably used for frictional materials, adhesives, and the like.

The thermosetting resin may be any resin that is cured by heating, and is not particularly limited, but a water-soluble thermosetting resin is preferred, and examples thereof include phenolic resin, urea resin, melamine resin, epoxy resin, and the like. Among these, the phenol resin or epoxy resin is preferred, and the phenol resin is particularly preferred.

The epoxy resin is not particularly limited so long as the epoxy resin is a resin having an epoxy group and exhibiting a water solubility; as the epoxy resin, a bisphenol A type epoxy resin, a bisphenol AD type epoxy resin, a bisphenol F type epoxy resin, a bisphenol AF type epoxy resin, a phenol novolac type epoxy resin, a cresol novolac type epoxy resin, an α-naphthol novolac type epoxy resin, a bisphenol A novolac type epoxy resin, and the like may be used without limitation; among these, a bisphenol A novolac type epoxy resin is preferable. Note that the epoxy resin as referred to herein includes a so-called epoxy resin precursor before becoming a cured type epoxy resin by undergoing three-dimensional cross-linking.

A curing agent may be used in the epoxy resin. The curing agent for the epoxy resin is not particularly limited, but as the curing agent, amines, acid anhydrides, imidazoles, mercaptans, phenolic resins, and the like may be mentioned.

As the phenolic resin, it is possible to use any general-purpose phenolic resins prepared by condensing phenols and aldehydes in the presence of acidic catalysts or in the presence of basic catalysts.

As the phenols used in the preparation of the phenolic resins, carbolic acid, m-cresol, p-cresol, o-cresol, p-alkylphenol, resorcin, and the like are suitably used, and mixtures of these can also be used. In addition, as the aldehydes used in the preparation of the phenolic resins, formaldehyde, acetaldehyde, and the like are suitably used, and the mixtures of these may also be used.

In addition, as the phenolic resin, both of a resol-type phenolic resin and a novolac-type phenolic resin can be used; moreover, various modified phenolic resins can also be used, and these may also be used as blended with each other. Moreover, as the phenolic resin used, the phenolic resins may be used by being selected according to the object, with respect to the properties such as the degree of the condensation of phenols with aldehydes, the molecular weight, and the residual percentage of the residual monomer; various phenolic resins being different from each other in these properties and having various grades are commercially available, and accordingly such commercially available phenolic resins may be appropriately used.

Note that the phenolic resin as referred to herein includes a so-called phenolic resin precursor before becoming a cured type phenolic resin by undergoing three-dimensional cross-linking. In addition, as the modified phenolic resin, the resol-type phenol resins modified with various thermoplastic polymers, or the novolac type phenol resins modified with various thermoplastic polymers may be mentioned. The thermoplastic polymer used in the modification for obtaining the modified phenolic resins is not particularly limited, but as such thermoplastic polymer, elastomers such as nitrile rubber, hydrogenated nitrile rubber, isoprene rubber, polybutadiene rubber, acrylic rubber, and ethylene acrylic rubber; polyamide resin, phenoxy resin, polyvinylbutyral resin, polyethylene terephthalate, polyurethane, methyl methacrylate-based copolymer, polyester resin, cellulose acetate polymer, polyvinyl alcohol, and the like may be mentioned.

The content of the thermosetting resin in the latex of the present invention is preferably 40 to 500 parts by weight, more preferably 50 to 450 parts by weight, and still more preferably 60 to 400 parts by weight, with respect to 100 parts by weight of the nitrile rubber contained in the latex.

In addition, the latex of the present invention preferably may further contain a friction modifier. As the friction modifier, for example, the following known modifiers are used: powders of inorganic substances such as calcium carbonate, magnesium carbonate, zinc oxide, barium sulfate, clay, talc, carbon black, graphite, alumina, mica, fluorite, zirconia, hematite, silica, antimony sulfide, iron sulfide, molybdenum sulfide, and sulfur; powders of metals such as iron, lead, and copper; powders of organic substances such as cashew dust, rubber dust, and powders of various cured resins; and calcium silicate staple fiber.

The content of the friction modifier in the latex of the present invention is, with respect to 100 parts by weight of the nitrile rubber, preferably 10 to 1000 parts by weight, more preferably 20 to 800 parts by weight, and still more preferably 30 to 500 parts by weight.

In addition, the latex of the present invention may further contain dispersants such as methylcellulose, carboxymethylcellulose, polyvinylpyrrolidone, polyvinyl alcohol, polyvinylmethyl ether, and polyvinylethyl ether; flexibilizer such as glycols; surfactants; and the like.

In addition, the latex of the present invention can contain, if necessary, the following as added therein: isocyanate, blocked isocyanate, oxazoline-based compounds, carbodiimide-based compounds, maleimides, thermosetting polyimides such as bis-allyl-nadi-imide, ethylene urea, 2,6-bis (2,4-dihydroxyphenylmethyl)-4-chlorophenol, various phenols-formaldehydes condensates (for example, resorcin-formaldehyde condensate, monohydroxybenzene-formaldhyde condensate, chlorophenol-formaldehyde condensate, resorcin-monohydroxybenzene-formaldehyde condensate, resorcin-chlorophenol-formaldehyde condensate, and modified resorcin-formalin resin such as a mixture composed of a condensate of sulfur monochloride and resorcin and resorcin formalin condensate), polyepoxide, modified polyvinyl chloride, carbon black, carbon nanotube, silane coupling agent, adhesive aid, alkylpyrridinium halides, bisulfates, charge adding agents such as distearyldimethyl ammonium methyl sulfate, release agents such as waxes, processing adis such as stearic acid, silica, silicate, clay, bentonite, vermiculite, nontronite, beidelite, volkonskoite, hectorite, saponite, laponite, sauconite, layered polysilicate (magadiite), kenyaite, ledikite, plaster, alumina, titanium dioxide, talc and the like, fillers such as particles of inorganic substances such as the mixtures of these, binders such as starch, stabilizers such as polyvinlylpyrrolidone, plasticizer, cross-linking agent, vulcanizing agent, vulcanization accelerator, co-cross-linking agent, zinc oxide, unsaturated carboxylic acid metal salt, triazine thiols, water absorbent, colorants such as inorganic pigment and organic pigment, chelating agent, dispersant, antioxidant, ultraviolet absorber, surfactant, compression recovery agent, antifoaming agent, bactericide, preservative, wetting agent, tack preventing agent, foaming agent, foam stabilizer, penetrant, water-repellent/oil repellent, antiblocking agent, formalin catcher, flame retardant, thickening agent, softener, antiaging agent, oil, ozone deterioration preventing agent, suspension aid, condensation retarder, fluid loss agent, water resistant additive, lubricant, and the like.

As the cross-linking agent, organic peroxide cross-linking agents, polyamine cross-linking agents, and the like may be mentioned.

The co-cross-linking agent is not particularly limited, but is preferably a low molecular weight or high molecular weight compound having a plurality of radically reactive unsaturated groups in the molecule. For example, polyfunctional vinyl compounds such as divinylbenzene and divinylnaphthalene; isocyanurates such as triallyl isocyanurate and trimethallyl isocyanurate; cyanurates such as triallylcyanurate; maleimides such as N,N'-m-phenylenedimaleimide and diphenylmethane-4,4'-bismaleimide; allyl esters of polyvalent acids such as diallyl phthalate, diallyl isophthalate, diallyl maleate, diallyl fumarate, diallyl sebacate, and triallyl phosphate; diethylene glycol bisallyl carbonate; allyl ethers such as ethylene glycol diallyl ether, triallyl ether of trimethylol propane, and partial allyl ether of pentaerythrit; allyl-modified resins such as allylated novolac resin and allylated resol resin; and 3 to 5-functional methacrylate compounds and acrylate compounds such as trimethylolpropane trimethacrylate and trimethylolpropane triacrylate; and the like may be mentioned. These may be used as single types or a plurality of types combined.

The latex of the present invention may be blended with various latexes. As the latex to be blended with, acrylonitrile butadiene rubber latex, styrene acrylonitrile butadiene copolymer latex, acrylonitrile butadiene vinylpyridine copolymer latex, styrene butadiene copolymer latex, styrene butadiene vinylpyridine copolymer latex, polybutadiene rubber latex, chloroprene rubber latex, chlorosulfonated polyethylene latex, natural rubber latex, polyisoprene rubber latex, emulsion of epichlorohydrin, emulsion of epichlorohydrin-polyether copolymer, emulsion of styrene-isoprene-styrene block copolymer, fluororubber latex, ethylene-propylene-diene copolymer latex (emulsion), acrylic acid ester copolymer latex, polyvinyl chloride emulsion, ethylene-vinyl acetate copolymer latex (emulsion), and the like may be mentioned.

A friction material can be obtained by depositing or mixing the latex of the present invention to the base material. The friction material of the present invention has the excellent heat resistance since it is obtained by using the latex of the present invention containing the nitrile rubber having the iodine value of 120 g/100 g or less. The friction material is suitable for various friction materials such as brake lining, disc pad, clutch facing and the like for automobiles and industrial machines.

The base material is not particularly limited, and usually a fiber base material is used as the base material. As the fiber base material, inorganic fibers or organic fibers made of copper, stainless steel, brass, aramid, carbon, glass, potassium titanate, rock wool, ceramic and the like may be mentioned.

In addition, the latex of the present invention is suitably used in the following wide range of applications: raw materials for nonwoven fabrics widely used as clothing such as clothing interlining, kimono interlining, and underwear, industrial materials such as filters, polishing cloth, and heat insulator, hygienic goods such as masks, gauze, white coats, automobile interior materials and filter for air conditioning; dip molding compositions for dip molding nipple, air ball, glove, balloon, sack and the like; latex adhesives for enhancing the adhesive force between fiber or woven fabric of the base material and the rubber member in toothed belt (timing belts for automobiles and general industries, timing belts in oil, oil pump belts and the like), poly-ribbed belt, lapped belt, V belt and the like; adhesives used for various fibers for reinforcing rubber (tire cord, twisted cord such as core wire, reinforcing threads for rubber hose, short fiber, foundation cloth for diaphragm); fiber treatment agents (As fibers, polyamide fibers including aliphatic polyamides such as nylon and aromatic polyamide such as aramide, polyester fiber, carbon fiber, glass fiber, cotton fiber, basalt fiber, and the like may be mentioned. Fibers may be used as single types alone or in combinations.); binders such as battery binder, fuel cell binder, paper coating binder, cement mixing agent, internal additive impregnating binder, and coating binder for ink-jet recording medium; papermaking; paper coating composition; resin modifying composition; foam rubbers (rubber foams) used for mattress, puff, roll, impact absorber, and the like; joint sheet, AL sheet (adsorption sheet using no paste), sheet material and sealing material such as gasket; coating material; and the like.

In particular, since the latex of the present invention is not easy to rot, aggregates are hardly generated even when stored for a long period of time. Therefore, even when the latex stored for a long period of time is used as a fiber treatment agent, a crack hardly occurs in a film famed from the latex, and a decrease in strength of a fiber can be prevented.

Further, since the latex of the present invention is not easy to rot, aggregate are hardly generated even when stored for a long period of time. Therefore, even when the latex stored for a long period of time is used as an adhesive, a bonding layer excellent in mechanical strength, abrasion resistance and water resistance can be famed. Accordingly, the latex of the present invention can be suitably used as a latex adhesive or an adhesive described above, that is, an adhesive for bonding a fiber base material such as fibers, woven fabrics, fibers for reinforcing rubbers (core wires), and the like and a rubber member. By using the latex of the present invention as the adhesive, a composite comprising the fiber base material and rubber member is provided in which the fiber base material and the rubber member are bonded by the bonding layer famed of the latex. When the latex of the present invention is used as the adhesive, the latex of the present invention preferably contains the above-mentioned phenolic resin, and more preferably contains a resorcin-formaldehyde resin. Examples of the type of fibers constituting the fiber base material include polyester fibers, nylon fibers, vinylon fibers, polyamide fibers such as aramid (aromatic polyamide) fibers, glass fibers, cotton, rayon fibers and the like. A shape of the fiber base material is not particularly limited, and examples thereof include filaments, staples, cords, ropes, woven fabrics (canvas, etc.), and the like. For example, a corded rubber toothed belt may be made by using as a cord as the fiber base material, and a base fabric coated rubber toothed belt may be made by using a base fabric-like fiber base material (e.g., a nylon-based fabric) such as a canvas. Examples of the rubber constituting the rubber member include nitrile rubber, highly saturated nitrile rubber, chloroprene rubber, and the like.

EXAMPLES

Hereinafter, the present invention will be described specifically by way of Examples and Comparative Examples. In each example, the term "parts" is based on weight unless otherwise specified. Note that the tests and the evaluations were carried out as follows.

Iodine Value

The iodine value of the nitrile rubber was measured in accordance with JIS K 6235.

Composition of Nitrile Rubber

A content ratio of each monomer unit constituting the nitrile rubber was measured by the following method.

Namely, the content ratio of the mono-n-butyl maleate unit was calculated by: adding 100 ml of 2-butanone to 0.2 g of nitrile rubber having a 2 mm square and stirring for 16 hours, then adding 20 ml of ethanol and 10 ml of water; by using a 0.02 N hydrous ethanol solution of potassium hydroxide, under stirring, titrating with thymol phthalein as an indicator at room temperature to determine the number of moles of carboxyl groups with respect to 100 g of the nitrile rubber after hydrogenation (units are ephr); and converting the determined number of moles into the amount of mono-n-butyl maleate units.

The content ratio of the 1,3-butadiene unit (also including the hydrogenated portions) was calculated by measuring the iodine value of the nitrile rubber before the hydrogenation reaction according to the above-mentioned method.

The content ratio of acrylonitrile units was calculated by measuring the nitrogen content in the nitrile rubber after hydrogenation by the Kjeldahl method according to JIS K6384.

The content ratio of the n-butyl acrylate unit was calculated as the balance of each monomer unit described above.

Residual Catalyst Quantity (Content of Palladium-Metal in Latex)

From the amount of palladium metal in palladium chloride used for hydrogenation and the amount of palladium metal recovered as the insoluble complex, the amount of palladium metal remaining in the latex was calculated.

Number of Fungi

In the latex of the hydrogenated nitrile rubber, a culture medium for detection of fungi (trade name "Easicult TTC," manufactured by Orion Diagnostica Inc.) was immersed, the number of the colonies generated in the culture medium for detection of fungi was observed, and the number of colonies per 1 ml of the latex was counted (units: CFU/ml).

Color Tone

The color tone of the latex of the hydrogenated nitrile rubber was measured by a color difference meter (trade name "Spectrophotometer", manufactured by KONICA MINOLTA INC.).

Redox Potential

The redox potential of the latex of the hydrogenated nitrile rubber was measured by immersing a redox electrode (manufactured by HORIBA, Ltd.) in the latex.

Example 1

2 parts of potassium oleate, 180 parts of ion-exchanged water, 16 parts of acrylonitrile, 36 parts of n-butyl acrylate, 5 parts of mono-n-butyl maleate, and 0.5 parts of t-dodecyl-mercaptan were placed in an autoclave in sequence. After nitrogen-purging the inside of the reactor, 43 parts of 1,3-butadiene were enclosed. The reactor was cooled to 10° C., and 0.01 parts of cumene hydroperoxide and 0.01 parts of ferrous sulfate were added. Then, the reactor was stirred for 16 hours while kept at 10° C., and the contents were mixed well. Thereafter, 10% of an aqueous solution of hydroquinone was added into the reactor to stop the polymerization. The conversion of polymerization was 90%. The unreacted monomers were removed from the polymerization reaction liquid to obtain a latex of a nitrile rubber.

With respect to palladium chloride (2700 ppm by weight in terms of the weight ratio of Pd metal in the palladium chloride/the nitrile rubber in the latex), an aqueous solution containing 2-fold molar equivalent of sodium chloride with respect to the Pd metal in the palladium chloride was added to obtain an aqueous solution of palladium. Then, an aqueous solution of catalyst having a pH of 12.0 was prepared by adding polyvinylpyrrolidone having a weight-average molecular weight of 5,000 to 300 parts of the obtained aqueous solution of palladium in the amount of 5 times as much as the Pd metal in the palladium chloride by the weight ratio, and further adding an aqueous solution of potassium hydroxide.

Then, the obtained latex of the nitrile rubber as mentioned above was adjusted to have 25 wt % of the total solid content concentration, and 400 parts of latex (100 parts by in terms of the solid content) prepared by adjusting the total solid content concentration and 300 parts of the aqueous solution of catalyst prepared as mentioned above were placed in the autoclave equipped with a stirrer, and nitrogen gas was flowed for 10 minutes to remove dissolved oxygen in the latex. After purging the inside of the system with hydrogen gas 2 times, it was pressurized with the hydrogen of 3 MPa. The contents were allowed to react for 6 hours by heating to 50° C., resulting in a reaction mixture of a hydrogenated nitrile rubber in a latex state.

Then, the pH of the obtained reaction mixture of the hydrogenated nitrile rubber in the latex state as mentioned above was adjusted to 7.0, and a mixed aqueous solution of dimethylglyoxime and potassium hydroxide was added, the dimethylglyoxime corresponding to 5-fold molar equivalent of Pd metal contained in the palladium chloride used in the hydrogenation reaction and the potassium hydroxide corresponding to 2-fold molar equivalent of the dimethylglyoxime, and further, a hydrogen peroxide solution corresponding to 50-fold molar equivalent of the Pd metal was added. Then, the mixture was heated to 80° C. and stirred for 5 hours, and an insoluble complex was precipitated in the latex.

Then, the insoluble complex was removed from the latex containing the insoluble complex prepared above by a centrifugation process with using a decanter type centrifuge device (product name "PTM300 type Screw Decanter", manufactured by TOMOE Engineering Co., Ltd.).

To the latex from which the insoluble complex was removed, with respect to the nitrile rubber in the latex, 100 ppm by weight of 1,2-benzisothiazolin-3-one (BIT) was added and stirred. The composition and iodine value of the nitrile rubber contained in the obtained latex are shown in Table 1. In addition, according to the above-described methods, the amount of residual catalyst, the number of fungi, the redox potential, and the color tone were measured for the obtained latex. The results are shown in Table 1.

Example 2

A latex was obtained and evaluated in the same manner as Example 1, except that the amount of the hydrogen peroxide solution added was changed to the amount corresponding to 40-fold molar equivalent of the Pd metal, and the amount of 1,2-benzisothiazolin-3-one (BIT) added was changed to 200 ppm by weight with respect to the nitrile rubber in the latex. The results are shown in Table 1.

Comparative Example 1

A latex was obtained and evaluated in the same manner as Example 1, except that the amount of the hydrogen peroxide solution added was changed to the amount corresponding to 12-fold molar equivalent of the Pd metal and the amount of 1,2-benzisothiazolin-3-one (BIT) added was changed to 200 ppm by weight with respect to the nitrile rubber in the latex. The results are shown in Table 1.

Comparative Example 2

A latex was obtained and evaluated in the same manner as Example 1, except that the amount of 1,2-benzisothiazolin-3-one (BIT) added was changed to 20 ppm by weight with respect to the nitrile rubber in the latex. The results are shown in Table 1.

Comparative Example 3

A latex was obtained and evaluated in the same manner as Example 1, except that the amount of palladium chloride added was changed so that the weight ratio of Pd metal in the palladium chloride/the nitrile rubber in the latex became 2300 ppm by weight; the amount of 1,2-benzisothiazolin-3-one (BIT) added was changed to 10 ppm by weight with respect to the nitrile rubber in the latex; and 2-methyl-4-isothiazolin-3-one (MIT) of 10 ppm by weight with respect to the nitrile rubber in the latex was further added. The results are shown in Table 1.

Comparative Example 4

2 parts of potassium oleate, 180 parts of ion-exchanged water, 16 parts of acrylonitrile, 36 parts of n-butyl acrylate, 5 parts of mono-n-butyl maleate, and 0.5 parts of t-dodecyl-mercaptan were placed in an autoclave in sequence. After nitrogen-purging the inside of the reactor, 43 parts of 1,3-butadiene was enclosed. The reactor was cooled to 10° C., and 0.01 parts of cumene hydroperoxide and 0.01 parts of ferrous sulfate were added. Then, the reactor was stirred for 16 hours while kept at 10° C., and the contents were mixed well. Thereafter, 10% of an aqueous solution of hydroquinone was added into the reactor to stop the polymerization.

The conversion of polymerization was 90%. The unreacted monomer was removed from the polymerization reaction liquid to obtain a latex of nitrile rubber.

To the resulting latex with the solid content concentration of 25%, 0.11 parts of the hydrogen peroxide solution was added, and further, 100 ppm by weight of 1,2-benzisothiazolin-3-one (BIT) with respect to the nitrile rubber in the latex was added and stirred. The composition and iodine value of the nitrile rubber contained in the obtained latex are shown in Table 1. In addition, according to the above-described methods, the amount of residual catalyst, the number of fungi, the redox potential, and the color tone were measured for the obtained latex. The results are shown in Table 1.

Comparative Example 5

A latex was obtained and evaluated in the same manner as Comparative Example 4, except that the amount of the hydrogen peroxide solution added was changed to 0.55 parts. The results are shown in Table 1.

than 120 g/100 g, even when the benzisothiazoline-based compound represented by the above general formula (1) was added to prevent the proliferation of fungi, the color tone (b*) of the latex was small and the yellowing was not appeared so much (Comparative Examples 4 to 5). On the other hand, in the latex containing the nitrile rubber having the iodine value of 120 g/100 g or less, when the benzisothiazoline-based compound represented by the above general formula (1) was added to prevent the proliferation of fungi, the yellowing was observed (Comparative Example 1). Therefore, the yellowing was found to be a particularly observed phenomenon when an attempt was made to prevent a latex containing a nitrile rubber having an iodine value of 120 g/100 g or less from the rot.

On the other hand, when the content of the benzisothiazoline-based compound was properly adjusted and the redox potential of the latex was properly adjusted, it was found that even a latex containing a nitrile rubber having an iodine value higher than 120 g/100 g was not easy to rot and the yellowing hardly occurred (Examples 1 to 2).

TABLE 1

| | | Unit | Example 1 | Example 2 | Comparative Example 1 | Comparative Example 2 | Comparative Example 3 | Comparative Example 4 | Comparative Example 5 |
|---|---|---|---|---|---|---|---|---|---|
| Composition of nitrile rubber | Acrylonitrile | wt % | 16 | 16 | 16 | 16 | 16 | 16 | 16 |
| | 1,3-butadiene | wt % | 43 | 43 | 43 | 43 | 43 | 43 | 43 |
| | Mono-n-butyl maleate | wt % | 5 | 5 | 5 | 5 | 5 | 5 | 5 |
| | n-butyl acrylate | wt % | 36 | 36 | 36 | 36 | 36 | 36 | 36 |
| Iodine value of nitrile rubber | | g/100 g | 8 | 8 | 8 | 8 | 8 | 210 | 210 |
| Catalyst | Amount of hydrogenation | ppm by weight | 2700 | 2700 | 2700 | 2700 | 2300 | — | — |
| | Amount of residual catalyst | ppm by weight | 48 | 97 | 650 | 48 | 53 | — | — |
| Preservative | BIT | ppm by weight | 100 | 200 | 200 | 20 | 10 | 100 | 100 |
| | MIT | ppm by weight | — | — | — | — | 10 | — | — |
| Redox potential | | mV | 262 | 204 | 73 | 219 | 228 | 69 | 202 |
| | Number of fungi | | 10^3 or less | 10^3 or less | 10^3 or less | 10^6 | 10^7 | 10^3 or less | 10^3 or less |
| Result | Color tone of latex | L* | 68.87 | 58.28 | 81.94 | 68.61 | 65.32 | 67.24 | 67.82 |
| | Color tone of latex | a* | −2.48 | −0.55 | −2.72 | −2.43 | −2.22 | −2.51 | −2.47 |
| | Color tone of latex | b* | −0.37 | −0.09 | 16.34 | −0.35 | −0.84 | −0.91 | −0.55 |

As shown in Table 1, when the latex contained nitrile rubber having an iodine value of 120 g/100 g or less and the benzisothiazoline-based compound represented by the above-mentioned general foiittula (1), the content of the benzisothiazoline-based compound was appropriately adjusted, and the redox potential of the latex was appropriately adjusted, it was found that the fungi hardly proliferated and the color tone (b*) of the latex was also small, so that it was not easy to rot or easy to yellow (Examples 1 to 2).

On the other hand, when the redox potential of the latex was too low, the color tone (b*) of the latex was large, and yellowing was observed (Comparative Example 1).

In addition, when the content of the benzisothiazoline-based compound represented by the above general formula (1) was too small, the proliferation of a large number of fungi was confirmed (Comparative Example 2), and unexpectedly, even when the benzisothiazoline-based compound represented by the above general formula (1) and the 2-methyl-4-isothiazolin-3-one (MIT) were used in combination, the proliferation of fungi could not be prevented (Comparative Example 3).

In addition, it was found that, with regard to the latex containing the nitrile rubber having the iodine value higher

The invention claimed is:

1. A latex comprising:
a nitrile rubber containing an α,β-ethylenically unsaturated nitrile monomer unit in a content of 8 to 50 wt % and an α,β-ethylenically unsaturated dicarboxylic acid monoester monomer unit in a content of 1 to 10 wt %, and having an iodine value of 120 g/100 g or less; and
a benzisothiazoline-based compound represented by the following general formula (1),

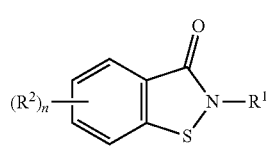

wherein $R^1$ represents a hydrogen atom, or a substituted or unsubstituted organic group, $R^2$ each independently represents a hydrogen atom, or a substituted or unsubstituted organic group, and "n" represents an integer of 0 to 4, wherein the content of the benzisothiazoline-based compound is 50 ppm by weight or more, with respect to the nitrile rubber, and a redox potential of the latex is 80 to 800 mV.

2. The latex according to claim 1, wherein the benzisothiazoline-based compound is 1,2-benzisothiazolin-3-one.

3. The latex according to claim 1, further comprising a thermosetting resin.

4. A composite comprising a fiber base material and a rubber member, wherein the fiber base material and the rubber member adhere by a bonding layer formed with the latex according to claim 1.

5. A composite comprising a fiber base material and a rubber member, wherein the fiber base material and the rubber member adhere by a bonding layer formed with the latex according to claim 2.

6. A composite comprising a fiber base material and a rubber member, wherein the fiber base material and the rubber member adhere by a bonding layer formed with the latex according to claim 3.

* * * * *